(12) United States Patent
Chow et al.

(10) Patent No.: US 12,499,051 B2
(45) Date of Patent: Dec. 16, 2025

(54) METHOD OF DETERMINING A CACHE SIZE USING AN ESTIMATION OF A NUMBER OF REQUESTS FOR CACHE MEMORY AND A SIZE OF THE REQUESTS

(71) Applicant: HUAWEI CLOUD COMPUTING TECHNOLOGIES CO., LTD., Gui Zhou Province (CN)

(72) Inventors: Chung-Man Abelard Chow, Kanata (CA); Ming Chen, Kanata (CA)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 18/628,916

(22) Filed: Apr. 8, 2024

(65) Prior Publication Data

US 2025/0315380 A1 Oct. 9, 2025

(51) Int. Cl.
*G06F 12/0871* (2016.01)
*G06F 12/126* (2016.01)

(52) U.S. Cl.
CPC ........ *G06F 12/0871* (2013.01); *G06F 12/126* (2013.01)

(58) Field of Classification Search
CPC .................... G06F 12/0871; G06F 12/126
See application file for complete search history.

(56) References Cited

U.S. PATENT DOCUMENTS

| 8,458,399 B2 * | 6/2013 | Humlicek | G06F 12/0646 711/170 |
| 2011/0082908 A1 * | 4/2011 | Ban | G06F 12/0813 709/213 |
| 2024/0152467 A1 | 5/2024 | Sultan et al. | |
| 2024/0160572 A1 | 5/2024 | Sultan et al. | |

OTHER PUBLICATIONS

Y. Chabchoub et al., "Sliding HyperLogLog: Estimating Cardinality in a Data Stream over a Sliding Window", 2010 IEEE International Conference on Data Mining Workshops, Sydney, NSW, Australia, 2010, pp. 1297-1303, doi: 10.1109/ICDMW.2010.18.

* cited by examiner

*Primary Examiner* — Aracelis Ruiz (57) ABSTRACT

The present disclosure provides a method and system for determining a cache size and allocating cache. A batch of requests for storing data in cache is received and associated with a set of counters configured to obtain respective estimated counts of unique hashed keys of requests associated therewith. Requests may be associated with respective counters in accordance with respective size of each request and a respective data block size associated with each counter. Estimated count of unique hashed keys of requests may be obtained at each counter for a selected expiry time based on Time to Live indicators of requests. Cache size to be allocated is computed by, for counters in the set, summing over a product of respective estimated count of hashed keys of requests at a counter with the data block size associated with the counter.

16 Claims, 5 Drawing Sheets

METHOD OF DETERMINING A CACHE SIZE USING AN ESTIMATION OF A NUMBER OF REQUESTS FOR CACHE MEMORY AND A SIZE OF THE REQUESTS

CROSS-REFERENCE TO RELATED APPLICATIONS

This is the first application filed for the present disclosure.

FIELD OF THE INVENTION

The present disclosure pertains to caching and, in particular, to methods and systems for determining a cache size to be allocated.

BACKGROUND

Accurate prediction of a cache size to be allocated is important in modern caching platforms, such as serverless caching platforms. A typical method for determining cache size relies on generating a miss ratio curve (MRC) for a cache which presents a miss ratio as a function of a cache size. In the prior art, one approach to generate a miss ratio curve is to calculate stack distances for data blocks (sequences of bits or bytes) in the cache and determine a frequency of occurrence for each stack distance, over a certain time, as a histogram.

One limitation of an MRC technique, according to prior art, is the inability to support variable-sized data blocks.

Another limitation of MRC techniques of the prior art is their inability to support cache data having a life span, also known as a Time to Live (TTL). The general interest of having data with a TTL is to prevent it from remaining in storage indefinitely in case it doesn't get accessed or becomes inaccessible.

Generating an MRC can be resource-consuming, requiring a system to keep track of unique entries in a cache among other tasks. Generated MRCs presents information that may not be all relevant or useful, such as high-miss ratio regions of the MRC.

Therefore, there is a need for a method and apparatus for determining a cache size to be allocated that obviates or mitigates one or more limitations of the prior art.

This background information is provided to reveal information believed by the applicant to be of possible relevance to the present disclosure. No admission is necessarily intended, nor should be construed, that any of the preceding information constitutes prior art against the present disclosure.

SUMMARY

An object of embodiments of the present disclosure is to provide a method and apparatus for determining and allocating a size of a memory cache based on a request size and an estimated count of unique requests.

In accordance with embodiments of the present disclosure, there is provided a method for allocating a cache in a memory. The method includes receiving a plurality of requests. Each request of the plurality of requests includes a request to store respective data to the cache, each request has a respective request size, and each respective data is associated with a respective key. The method includes associating the plurality of requests to a set of counters. Each counter of the set of counters is associated with a respective data block size that is different than the data block size associated with any other counter of the set of counters. The associating of the plurality of requests to the plurality of counters includes, for each request, determining which counter of the set of counters has a smallest associated respective data block size that is at least as large as the respective request size of the request and associating a hash of the key associated with the respective data of the request with the determined counter, the hash of the key being a hashed key. The method includes determining a cache size of the cache based on a number of unique hashed keys associated with each respective counter of the set of counters and the respective data block size of each counter of the set of counters. The method includes allocating the cache by reserving, for caching, a portion of the memory, the portion of the memory having a size at least equal to the cache size.

According to embodiments, determining the cache size may include summing, over all the counters of the set of counters, a product of an estimated count of unique hashed keys associated with a respective counter by the data block size of the respective counter.

According to an embodiment, the plurality of counters may be a plurality of HyperLogLog (HLL) counters. In such embodiment, the plurality of HLL counters may be utilized to obtain the estimated count of unique hashed keys associated with the respective counter.

According to an embodiment, one or more request of the plurality of requests may have a respective Time to Live (TTL) indicator. In such embodiment, the plurality of HLL counters may be a plurality of sliding HLL counters and the determining of the cache size may include summing over all the sliding HLL counters of the plurality of sliding HLL counters, for a selected expiry time, a product of an estimated count of unique hashed keys of non-expired requests associated to a sliding HLL counter with the respective data block size.

According to embodiments, the allocated cache may be one of an allocated serverless cache, an allocated write-behind cache, an allocated side cache, an allocated on-demand cache, or a combination thereof.

According to an embodiment, the plurality of counters may include a single counter associated with a fixed data block size of a respective single data block. In such embodiment, the associating of the plurality of requests to the plurality of counters comprising the single counter may include, for each request of the plurality of requests, determining that the fixed data block size of the respective single data block is at least as large as the request size of the request. In such embodiment, determining the cache size may include computing a product of the estimated count of unique hashed keys associated with the single counter with the fixed data block size of the respective single data block.

According to embodiments, when the request size of a request of the plurality of requests is larger than the data block size of any of the plurality of counters, and when the request size is equal to or less than a predetermined maximum size, an additional counter may be added to the plurality of counters. The additional counter may have associated thereto an additional counter data block size that is at least as large as the request size of the request.

According to embodiments, the data block size may be configurable.

According to embodiments, for each associated request, a respective expiry time based on the respective TTL indicator may be stored in a sorted list.

According to embodiments, each expired respective expiry time may be removed from the sorted list.

According to embodiments, the selected expiry time may be one of a median of respective expiry times in the sorted list, a mean of the respective expiry times in the sorted list, and a minimum of the non-expired respective expiry times in the sorted list.

According to embodiments, the cache of the determined size may be allocated to satisfy a predefined performance requirement.

In accordance with embodiments of the present disclosure, there is provided a system for allocating a cache. The system includes at least one processor and machine readable memory storing machine readable instructions. When executed by the at least one processor, the instructions configure the system to receive a plurality of requests. Each request of the plurality of requests includes a request for storing respective data to a caching memory, each request has a respective request size, and each respective data is associated with a respective key. The instructions configure the system to associate the plurality of requests to a set of counters. Each counter of the set of counters is associated with a respective data block size that is different than the data block size associated with any other counter of the set of counters, by, for each request of the plurality of requests, determining which counter of the set of counters has a smallest associated respective data block size that is at least as large as the request size of the request and associating a hash of the key associated with the respective data of the request with the determined counter, the hash of the key being a hashed key. The instructions configure the system to determine a cache size based on a number of unique hashed keys associated with each respective counter of the set of counters and the respective data block size of each counter of the set of counters. The instructions configure the system to allocate the cache by reserving, for caching, a portion of the caching memory, the portion of the caching memory having a size at least equal to the cache size.

According to embodiments, the machine readable memory storing machine readable instructions which when executed by the at least one processor, may configure the at least one processor to determine the cache size by summing, over all the counters of the set of counters, a product of an estimated count of unique hashed keys associated with a respective counter by the data block size of the respective counter.

In accordance with embodiments of the present disclosure, there is provided a method to allocate a cache in a memory. The method includes receiving a plurality of requests. Each request of the plurality of requests includes a request for storing respective data to the cache, each request has a respective request size, each respective data is associated with a respective key, and at least one request of the plurality of requests having a respective Time to Live (TTL) indicator. The method includes associating the plurality of requests to a set of sliding HLL counters. Each sliding HLL counter of the set of HLL counters is associated with a respective data block size. The associating of the plurality of requests to the set of sliding HLL counters includes, for each request, determining which sliding HLL counter of the plurality of sliding HLL counters has a smallest associated respective data block size that is at least as large as the respective request size of the request and associating a hash of the key associated with the respective data of the request with the determined counter, the hash of the key being a hashed key. The method includes determining a cache size of the cache, for a selected expiry time, based on a number of unique hashed keys associated with each respective sliding HLL counter of the set of sliding HLL counters and the respective data block size of each sliding HLL counter of the set of sliding HLL counters. The method includes allocating the cache by reserving, for caching, a portion of the memory, the portion of the memory having a size at least equal to the cache size.

According to embodiments, determining the cache size of the cache, for the selected expiry time, may include summing, over all the sliding HLL counters of the set of sliding HLL counters, a product of an estimated count of unique hashed keys associated with a respective sliding HLL counter by the data block size of the respective sliding HLL counter.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The present disclosure sets forth various embodiments via the use of block diagrams, flowcharts, and examples. Insofar as such block diagrams, flowcharts, and examples contain one or more functions and/or operations, it will be understood by a person skilled in the art that each function and/or operation within such block diagrams, flowcharts, and examples can be implemented, individually or collectively, by a wide range of hardware, software, firmware, or combination thereof. As used herein, the term "about" should be read as including variation from the nominal value, for example, a +/−10% variation from the nominal value. It is to be understood that such a variation is always included in a given value provided herein, whether or not it is specifically referred to.

The present disclosure provides a method for determining the size to be allocated to a memory cache, for example by a caching server. The method identifies the size of requests in a batch of requests and associates a hashed key of each request with a respective counter in a set of counters. Each counter of the set may have a respective data block size associated thereto, in which case hashed key of each request is associated with a counter having the associated data block size at most that of the size of the request. Each counter of the set may have a memory block size window (MBSW) defined by an upper size limit corresponding to the respective data block size and optionally by a lower size limit or a minimum data block size representative of the lower size limit associated therewith, in which case the hashed key of each request may be associated with a counter whose MBSW bounds the size of the request. After the requests are counted by obtaining the respective estimated count of the associated hashed keys at each counter, the size of the (e.g. caching server) memory cache to be allocated may be determined based on hashed keys associated to each counter and the respective data block size associated with each counter by summing, over all the counters in the set of counters, a product of the size of the counter (defined by its upper size limit, i.e., the respective data block size) with the estimated count of unique hashed keys associated with the counter. Requests that have the same hashed key are counted only once by each counter. Advantageously, embodiments of the disclosure do not require calculating MRCs, and potentially require fewer computing and memory resources than those required in prior art methods to estimate cache size to be allocated.

Figure 1A:
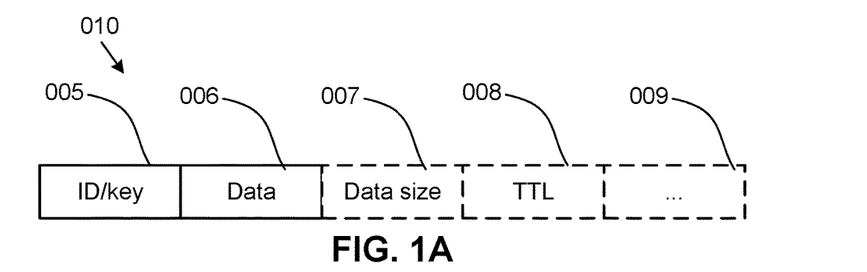
FIG. 1A shows a block diagram of a request for storing data in a cache, according to embodiments of the present disclosure.

FIG. 1A shows a block diagram of a request 010 for storing data in a cache, according to embodiments of the present disclosure. Request 010 includes a key field 005 indicating a key (also referred to as identifier, ID, label, for example). The key is associated with the data or value of the request and together can be referred to as a "key-value pair". Request 010 includes a data field 006, which contains the data to be stored in the cache. The data in the data field 006 may be encrypted or encoded, or neither encrypted nor encoded. Request 010 may also include data size field 007 representing or indicating the size of data of the data field 006 that the request is requesting (e.g., from a cache providing service) to be stored in cache.

The request 010 may also include a TTL field 008 indicating a TTL of the request corresponding to a length of time the data associated with the request is to be stored in the cache. The units of the TTL values in the TTL field 008 may be any suitable time units such as, for example, seconds. In some embodiments, the TTL field may be a clock time until which the data of the request 010 is to be kept in the cache. Request 010 may include other element fields 009, indicating, for example, dependency and/or compression of the data of the request. In cases where request 010 does not include a data size field 007, it may be possible to determine the size of the data from other fields in the request, such as, for example, the data field 006.

In embodiments, a size of the request $S_R$ is used in determining a cache size. The request size $S_R$ includes the size of the request key $S_{KEY}$, such as the key in the key field 005, and the size of the data of the request $S_{DATA}$, such as the data of the data field 006 of the request. In other words, the size of the request (i.e., request size) includes the size of the respective key-value pair for the request. As readily understood by a person skilled in the art, a cache stores the data and the key of a request, the key being subsequently used to access the data (e.g., update, retrieve, etc.). In embodiments, using the request size defined as a sum of the request key and request data, for determining the cache size to be allocated advantageously takes into account both the size of the key which is stored in the cache with the data and the size of the data itself, thereby contributing, at least in part, to the determined cache size being close to the actual cache size needed. Moreover, in some cases a data size of a request may be smaller than a size of the request key, therefore taking in account both the size of the data and the size of the key enables more accurate determination of the cache size to be allocated with respect to the actual size needed for storing the data and its corresponding key.

In embodiments, the request size can be obtained (e.g., computed, calculated) by summing the size of the request key $S_{KEY}$ (e.g., obtained from the request key field 005) with the size of the data of the request $S_{DATA}$ obtained from the data of the request (e.g., of data field 006). If the request includes the data size indication $S_{DATA}$, such as the data size field 007, then the request size can be obtained by summing the size of the request key (e.g., obtained from the request key field 005) directly with the data size from data size field 007. In some embodiments, where any other request information is to be stored in the cache along with the data and request key the size of such information may be included in the request size along with the size of the data of the request and the size of the key of the request.

Figure 1B:
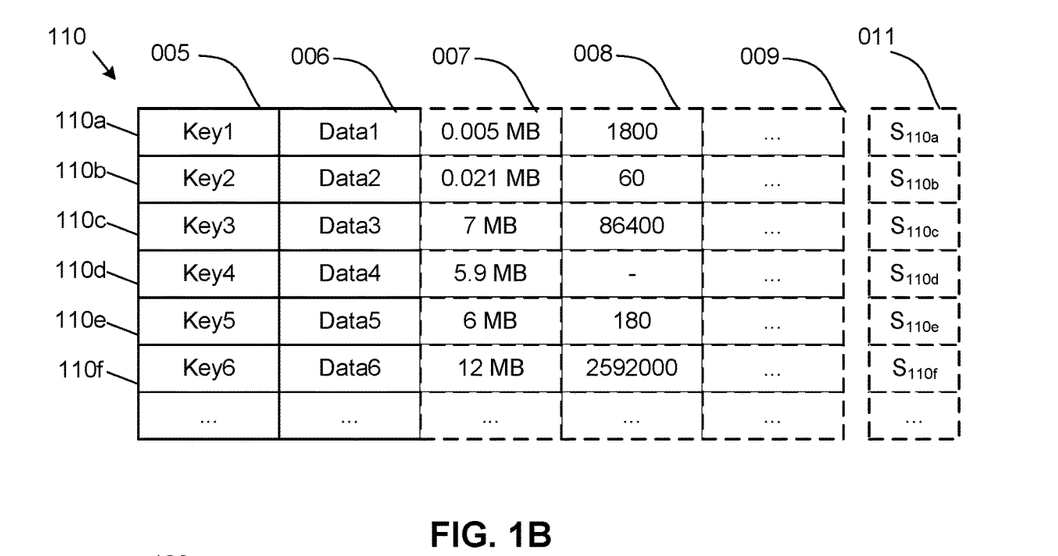
FIG. 1B shows a block diagram of a batch of requests for storing data in a cache, according to embodiments of the present disclosure.

FIG. 1B shows an example of a batch of requests 110 that comprises at least 6 requests where each request has respective data which, in this embodiment, is different from the data of any other request in the batch of requests 110. The 6 request instances shown (i.e., 110a through 110f) include respective data size fields 007 indicating the respective size of data of the request $S_{DATA}$. Request 110a is for storing data having a size of 5 KB (0.005 MB) and has a TTL indicator TTL1 of 1800 seconds. Request 110b is for storing data having a size $S_{110b}$ of 21 KB (0.021 MB) and has a TTL indicator TTL2 of 60 seconds. Request 110c is for storing data having a size $S_{110c}$ of 7 MB and has a TTL indicator TTL3 of 86400 seconds. Request 110d is for storing data having a size $S_{110d}$ of 5.9 MB and does not have a TTL indicator. Request 110e is for storing data having a size $S_{110e}$ of 6 MB and has a TTL indicator TTL5 of 180 seconds. Request 110f is for storing data having a size $S_{110f}$ of 12 MB and has a TTL indicator TTL6 of 2592000 seconds.

In embodiments, request size can be determined by adding the size of the request key with the size of the data of the request, as described elsewhere herein. With reference to FIG. 1B and assuming the size of each request key is 5 KB (0.005 MB), the corresponding request size 011 for each request is $S_{110a}$=0.01 MB for the first request 110a, $S_{110b}$=0.026 MB for the second request 110a, $S_{110c}$=7.005 MB for the third request 110c, $S_{110d}$=5.905 MB for the fourth request 110d, $S_{110e}$=6.005 MB for the fifth request 110e, and $S_{110f}$=12.005 MB for the sixth request 110f. Notably, in this example only the size of the request key 005 and the data size 007 of the request is used in obtaining the respective request size.

FIG. 1C

Figure 1C:
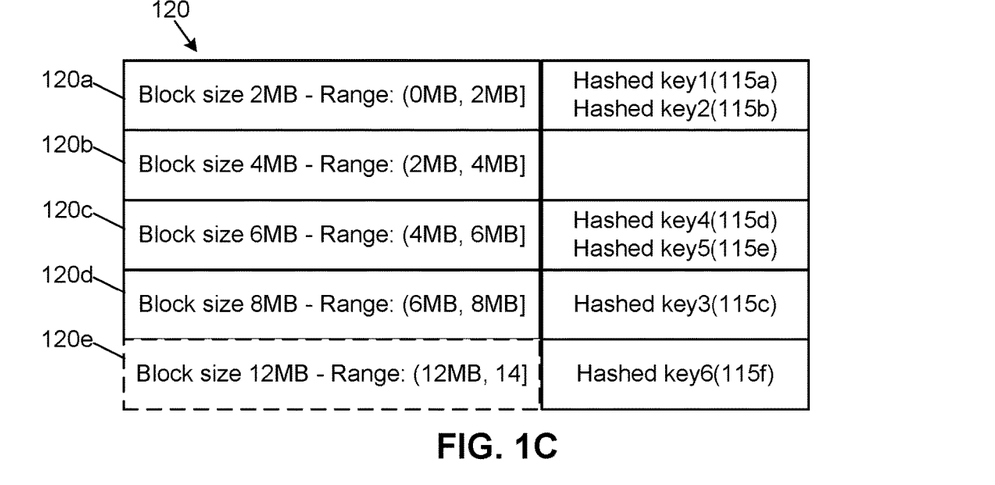
FIG. 1C shows a block diagram of a group of counters in accordance with the present disclosure.

FIG. 1C shows an embodiment of a group of counters 120 (also referred to herein as a set of counters or a plurality of counters) in accordance with the present disclosure. The counters of the group of counters 120 are configured to count the requests of a batch of requests such as, for example, the batch of requests 110 of FIG. 1B, by obtaining an estimated count of the associated hashed keys at each counter. The group of counters 120 includes counter 120a that has associated thereto a data block size of 2 MB and a MBSW that ranges from greater than zero up to and including 2 MB, counter 120b that has associated thereto a data block size of 4 MB and MBSW that range from greater than 2 MB up to and including 4 MB, counter 120c that has associated thereto a data block size of 6 MB and a MBSW that ranges from greater 4 MB up to and including 6 MB, and counter 120d that has associated thereto a data block size of 8 MB and a MBSW that ranges from greater than 6 MB up to and including 8 MB. If the requests 110a through 110f of FIG. 1B were counted using the group of counters 120 of FIG. 1C, and prior to the expiry of any of the TTL values, then before counting, the first request 110a having the request size $S_{110a}$=0.01 MB would be associated with the first counter 120a and have its hashed key 115a added thereto, the second request 110b having the request size $S_{110b}$=0.026 MB would be associated with the first counter 120a and have its hashed key 115b added thereto, the third request 110c having the request size $S_{110c}$=7.005 MB would be associated with the fourth counter 120d and have its hashed key 115c added thereto, the fourth request 110d having the request size $S_{110d}$=5.905 MB would be associated with the third counter 120c and have its hashed key 115d added thereto, the fifth request 110e having the request size $S_{110e}$=6.005 MB would be associated with the third counter 120c and have its hashed key 115e added thereto, and the sixth request 110f having the size $S_{110f}$=12.005 MB would be associated with the fifth counter 120e and have its hashed key 115f added thereto. Notably, the fifth counter 120e, not originally present in the set 120 and having associated thereto a data block size of 14 MB and a MBSM that ranges from greater than 12 MB up to and including 14 MB, was added to the set 120 in response to determining that the set 120 has no counter with an associated data block size at least as large as the size $S_{110f}$=12.005 MB of the sixth request 110f.

In the above example and in embodiments of the present disclosure, rounding up of the respective size of the request $S_R$ to a nearest available data block size (e.g., upper size limit) is done to determine which (e.g., sliding HLL) counter of the set of (sliding HLL) counters has a smallest data block size that is at least as large as the respective size of the request. An increment of the data block size $S_{inc}$ (e.g. 2 MB increment) may be specified (e.g., preset or predetermined) for a set of counters, for example, such that the associated data block size $S_N$ of a counter N+1 can be defined by $S_{N+1}=S_N+nS_{inc}$, where n is a positive integer and $S_N$ is the associated data block size of a preceding counter having a next smaller associated data block size. In some embodiments, a new counter, such as the fifth counter 120e of FIG. 1C, can be added non-consecutively to the set of counters. A slot may be provided (e.g. reserved, predetermined, allocated) for each data block size up to a preset cache size, such as a maximum cache size allowed to be allocated by a caching server or platform. Such plurality or a set of slots may be provided for the set of counters. In other words, the set of counters may be pre-organized into slots, each slot being a place holder for a counter. A slot may be unoccupied by a respective counter initially and may be generated at the slot as needed when a request with a corresponding size is received. Thereby, in some embodiments, counters may be generated or added to respective slots dynamically in response to receiving requests with sizes corresponding to data block sizes associated to respective slots. If a slot with associated data block size needed to accommodate a particular request is not found in the set of slots (e.g. size of request exceeds the preset maximum cache size), then a respective counter is not generated. Providing such plurality of slots and generating respective counters dynamically in response to receiving requests advantageously limits (e.g. minimizes) resources (e.g. memory, computing, processing) associated with at least some steps of determining a cache size in accordance with embodiments described herein.

VSB

In embodiments, a size of data block (i.e., upper size limit) that is a power of 2 can be sufficient, but a base other than two can also be used. For example, a data block (i.e., upper size limit) can have a size ranging from 1 byte to $2^m$ bytes, where m is an integer. Once a value for exponent m is selected, the number $n_c$ of counters in a set of counters can be limited to $n_c$=m+1. A method for determining a cache size to be allocated, according to embodiments, can define a minimum number of counters required, by supporting a number $n_c$ of counters equal to $n_c$=2(m−1+1), where m and 1 are integers defining the range of data block sizes that are supported: from $2^1$ bytes to $2^m$ bytes, for example. This method may be used, for example, to define a lower bound on the number of counters needed.

In embodiments, a requested size of cache can be rounded up to the next data block size. For example, if a set or plurality of counters (or plurality of slots with associated data block sizes) supports memory blocks of 2 KB and 4 KB, and there is request for a 3.5 KB block, it can be rounded up to a 4 KB block to be associated therewith. More generally, if the exact request size (e.g., combined requested cache size and the request key size) corresponds to a data block of a size that is not present in the set of (e.g., HLL or sliding HLL) counters (or a set of slots), the request size can be rounded up to and associated with a nearest available size of a cache data block.

In embodiments, if a request size (i.e., at least the combined size of requested data and the request key size) is bigger than any associated data block size associated with a respective counter in the set or plurality of counters (or a set of slots), then a corresponding counter having a data block of the next nearest or matching size associated therewith can be added to the set of counters. Such addition allows each request to be associated with a (already available or newly added) counter and based on the request size and, therefore, accounted for in determining the cache size to be allocated. Such counter is a new or added counter in the set of counters and belongs to the set of counters.

In embodiments, use of sets of counters for batches of requests is configurable based on, for example, a user setting, use of (e.g., computing, memory, etc.) resources, and such. In some embodiments, a new (i.e., default) set of counters may be used for a next batch or requests. In such cases, any new counter added to the (e.g., default) set when processing a previous batch of requests may be removed (e.g., deleted, evicted) from the set after a cache size has been determined and before processing the next batch of requests.

In other embodiments, a previously generated set of counters may be used for a next batch of requests. In such cases, any new counter added to the (e.g., default) set when processing a previous batch of requests may remain in the set when processing the next batch of requests.

In embodiments, a new counter may not be added to a set if a request size exceeds a preset cache size, such as a maximum cache size allowed to be allocated by a caching server or platform. For example, processing a request having a size of 16.1 GB by a system (e.g., caching server or platform) having a maximum allowed cache size of 16 GB will not result in addition of a new counter with an associated data block size of at least 16.1 GB. The preset cache size may be configurable, for example, as a system setting or parameter, either automatically (e.g., in response to more memory being available or in response to reaching a predetermined threshold of use of cache of a certain size) or manually, such as by a user request or caching service provider.

Therefore, in embodiments, a method for determining a cache size to be allocated can include, for a particular request of a batch or plurality of requests, determining that each counter of a set or plurality of counters has a respective data block size associated therewith that is less than the size of the particular request. Upon such determining, an additional counter in the set or plurality of counters is generated (e.g. at a corresponding slot) if the size of the particular request is at most equal to such preset cache size. If generated, the additional counter has associated therewith a respective data block size that is at least as large as the size of the particular request.

In embodiments, each respective indicated data block size is constant. Such constant (e.g., permanent) data block size may be preselected or predetermined, for example by proving a plurality of slots having respective data block sizes associated therewith, before or during deployment of the system and use of methods disclosed herein for allocating cache (and determining cache size to be allocated).

In embodiments, the method for allocating cache can allow a smaller amount of memory usage to be sufficient, compared to methods requiring calculation of an MRC and methods that use counter sets, for example.

In embodiments, a smaller amount of memory can be required with data structures having a smaller number of associated data block sizes, and therefore a smaller number of counters in the set of counters.

In other embodiments, an data block size can be configurable. For example, it may be desired to adjust various parameters, such as increments of data block size, to satisfy a given performance requirement, such as memory usage noted above. Such performance requirements may be related, for example, to resource consumption (e.g., computing power, memory usage, available bandwidth, time), cache availability (e.g., cache available for allocating), caching platform parameters, user requirements (e.g., cache size determination accuracy, request processing time), etc.

For write-behind caching servers and serverless caching platforms, for example, embodiments disclosed herein can be used to approximate the maximum cache size needed and allocate, for example, a fraction of the predicted cache size to a customer. Such an approach can potentially reduce costs for the customer and contribute to maintaining caching platform capacity.

Embodiments of the present disclosure include a system and methods to determine a cache size to be allocated that support variable sized block (VBS) and Time to Live (TTL) caching features.

Figure 2:
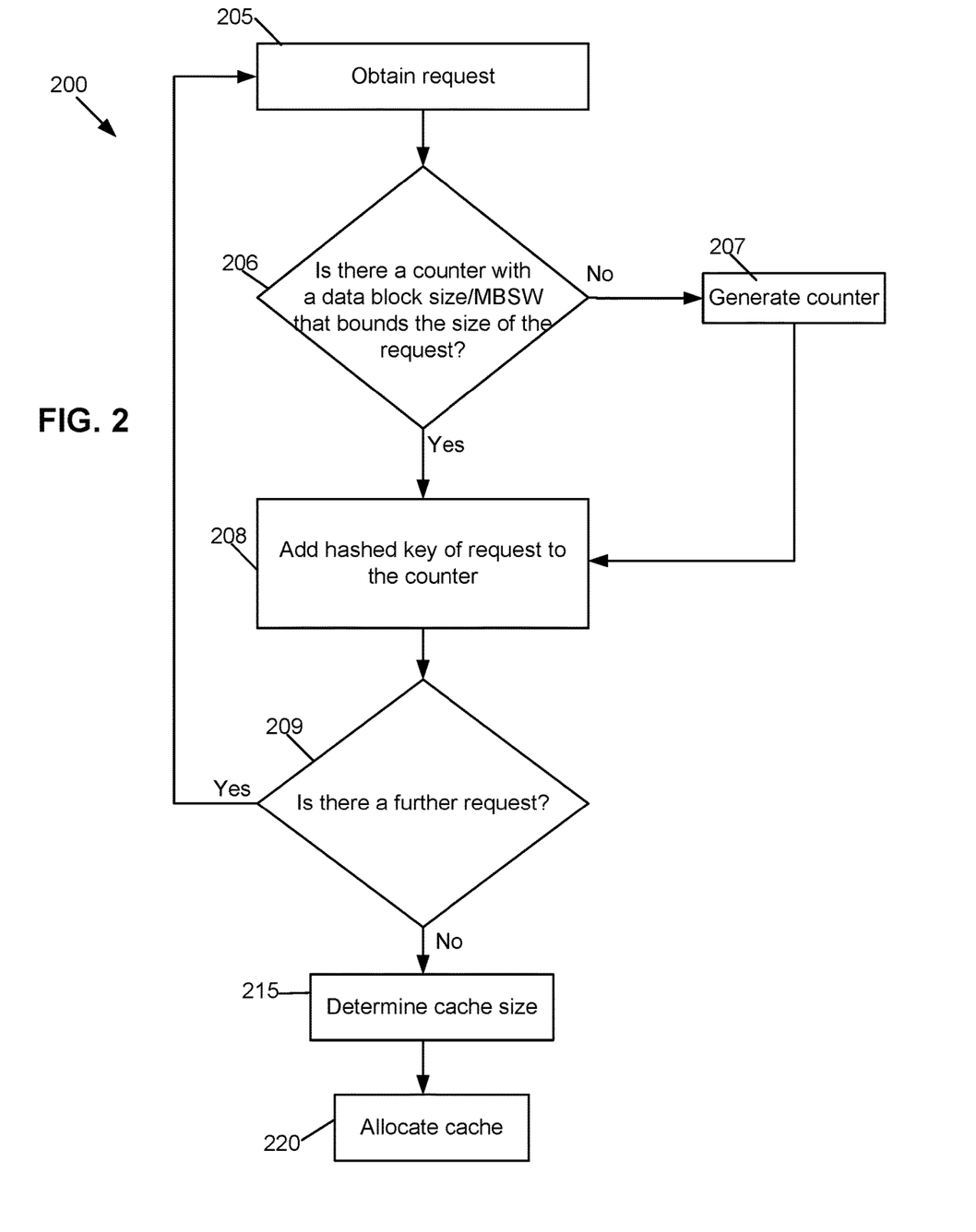
FIG. 2 shows a flowchart of a method for allocating a cache supporting a VSB caching feature, according to embodiments of the present disclosure.

To improve cache utilization, methods, according to embodiments, can be implemented by a caching system provided by a cloud-based platform. A possible benefit is the ability to adjust the cache size of a workload based on the determined cache size. This would allow a customer (e.g., applications, users) to return unused cached resources and therefore pay less for a service, while the cloud-based platform can resell the unused resources for more revenue.
FIG. 2

FIG. 2 shows a flowchart of an embodiment of a method 200, supporting a VSB caching feature, for allocating a cache in accordance with the present disclosure. The method 200 includes obtaining (e.g., receiving) 205 a request (e.g., in a batch of requests) for storing data in a cache. At action 206, the method determines if there exists a counter (e.g., in a group or set of counters) with a respective data block size at least as large as the request size or a respective MBSW that bounds (i.e., by its upper bound and optionally by its lower bound) the request size. If there is no such counter, then the method 200 may proceed to action 207 where a counter having a data block size at least as large as the request size or a respective MBSW that bounds the request size is generated (e.g., added to the group of counters), as described elsewhere herein. The counter may be generated in accordance with any suitable counter generation rules that specify the optional lower size limit and the required upper size limit of the MBSW (i.e., the data block size). Action 206 may include determining the request size (e.g., using the size of request key and size of data of the request) as described elsewhere herein.

When it is determined, at action 206 that there is a counter with a respective data block size at least as large as the request size or a respective MBSW that bounds the request size, then the method proceeds to action 208 where a hashed key of the request (i.e., request key having a hashing function applied thereto) is added to the counter, thereby associating the request and key thereof to the counter. Action 208 may also be performed after action 207.

The method 200 may then determine, at action 209, if there is another request to be processed (e.g., if there is another request in the batch of requests) for determining the size of the cache to be allocated. If there is such a request, the method proceeds back to action 205, otherwise, the method proceeds to action 215 where the cache size to be allocated is determined. The size of the memory cache to be allocated may be determined based on hashed keys associated to each counter and the respective data block size associated with each counter by summing, over all the counters in the set of counters, the product of the associated data block size of a counter (i.e., the upper bound thereof) by an estimated count of unique hashed keys associated to the counter at action 208. Referring back to FIG. 1C, which assumes that the six requests 110a through 110f are non-expired at the time of determining the cache size (i.e., counted prior to the expiration of any of TTL values) and have unique respective hashed keys, the determined cache size is:

Cache size =

$$(2 \times 2MB) + (0 \times 4MB) + (2 \times 6MB) + (1 \times 8MB) + (1 \times 14MB) = 38MB$$

At action 220 of the method 200, a cache having the determined cache size is allocated, for example by a caching server. Allocating the cache having the determined size includes reserving a portion of the memory of a caching server having the determined cache size for storing data. According to embodiments, a step of instructing (e.g. by at least one processor configured to determine a cache size as disclosed herein) a caching server to allocate cache of determined size may be included.

The counters of the group of counters 120 can be of any suitable type capable of estimating (e.g., approximating) a cardinality of a set of associated requests or hashed keys thereof (i.e., the number of associated requests or hashed keys thereof), which may depend on the specific information contained in the requests of the group of requests 110 and on the changes in the requests over time (i.e., the dynamics of the requests, such as a data associated with a request or a TTL of the request being updated). For example, in some embodiments the counters may be sliding HyperLogLog (HLL) counters when caching system is configured to support TLL and VSB caching features. Similarly, other counters such as LogLog counters and UltraLogLog counters may be used where applicable, as readily understood by a person skilled in the art. In some embodiments requiring a precise (e.g., exact) count of requests instead of an estimate or approximation, suitable exact counters may be implemented with methods and system disclosed herein given sufficient suitable system memory and processing resource requirements being available for use of such exact counters.

Figure 3:
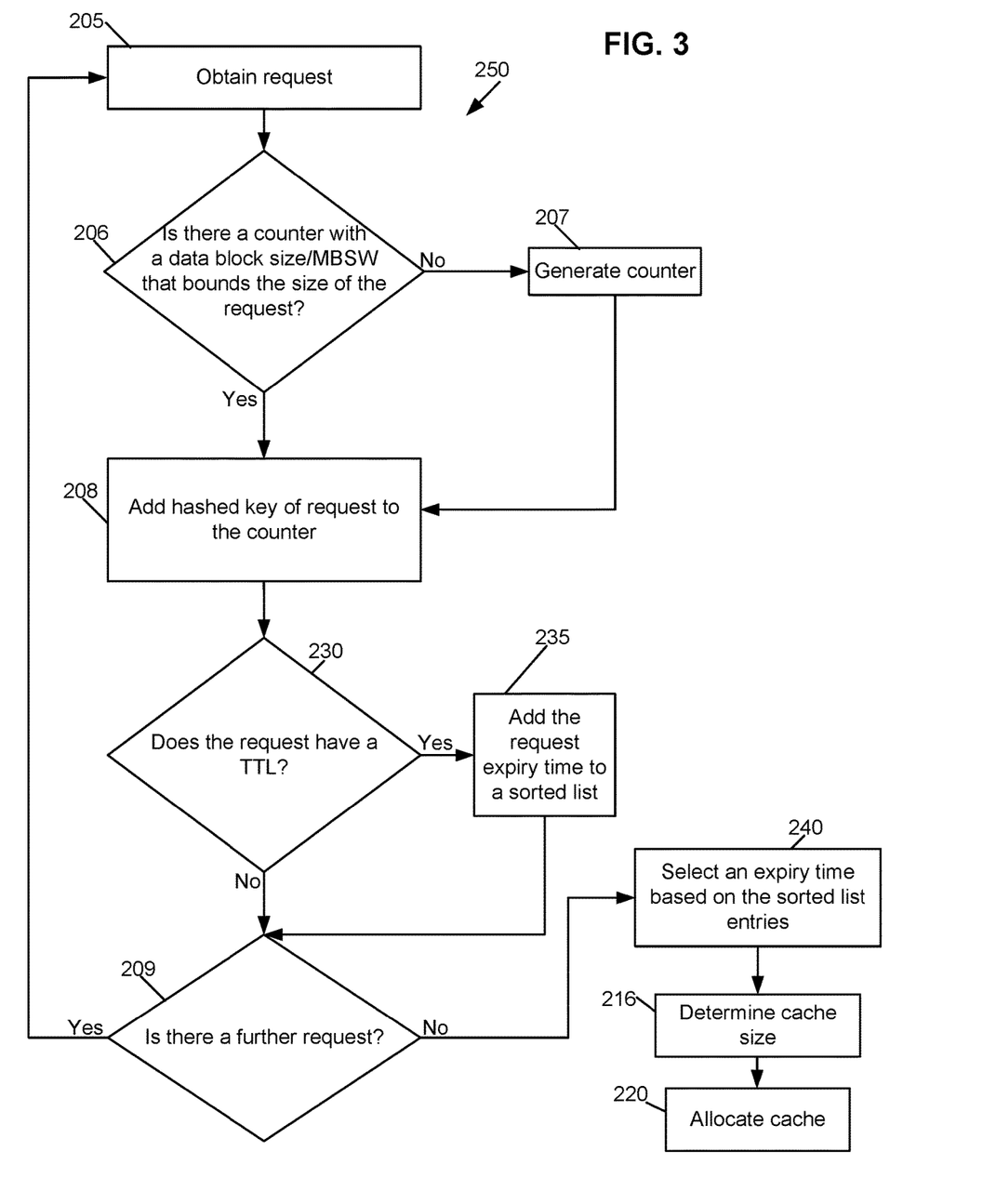
FIG. 3 shows a flowchart of a method for allocating a cache supporting VSB and TTL caching features, according to embodiments of the present disclosure.
Figure 4:
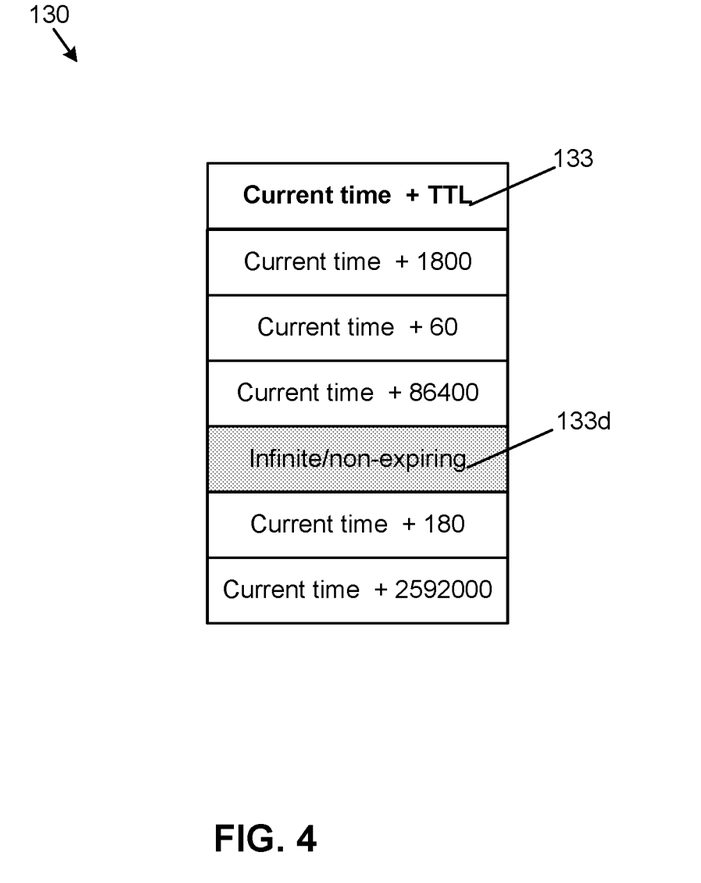
FIG. 4 shows a block diagram of a sorted list, according to embodiments of the present disclosure.

FIG. 3 shows a flowchart of an embodiment of a method 250, supporting a VSB and TTL caching features, for allocating a cache in accordance with the present disclosure. The method 250 includes actions 205, 206, 207, 208 and 209 described previously with reference to FIG. 2. After action 208 of adding a hashed key of the request to the counter having a data block size at least as large as the request size or a respective MBSW that bounds the request size, the method proceeds to determine 230 if the request has a TTL. If the request has a TTL, then the method 250 proceeds to action 235 of adding a respective expiry time of the request, based on its TTL and corresponding to a current time (e.g. time the request is received) plus the TTL, to a sorted list, an embodiment of which is shown in FIG. 4. If the request does not have a TTL, then no action is taken with respect to the sorted list and the method proceeds to action 209. In another example described elsewhere herein, an indication of an infinite or non-expiring expiry time (e.g., 133d in sorted list 130 of FIG. 4) may be added to the sorted list, for example, for a request not having a TTL or having an infinite TTL (e.g., a very long TTL which, in some cases for practical reasons may be considered as infinite).

The method 200 may determine, at action 209, if there is another request to be processed (e.g., if there is another request in the batch of requests) in determining the size of the cache to be allocated. If there is such a request, the method proceeds back to action 205, otherwise, the method proceeds to action 240 to select an expiry time $t_{selected}$ based on entries in the sorted list, as described elsewhere herein. After determining a selected expiry time at action 240, method 250 proceeds to action 216 where the cache size to be allocated is determined based on the selected expiry time and counted requests that are not expired at the time action 216 is taken. The size of the memory cache to be allocated for storing data of requests may be determined based on hashed keys associated to each counter and the respective data block size associated with each counter by summing, over all the counters in the set of counters, the product of the associated data block size of the counter (i.e., the upper bound of MBSW thereof) by an estimated count of unique hashed keys associated to the counter at action 208 and based on the selected expiry time as described elsewhere herein.

In one example according to embodiments, the selected expiry time may be a selected minimum non-expired time in the sorted list such that only associated hashed keys of requests having a respective expiry time equal to or greater than the selected minimum non-expired time are used in determining the cache size. Notably, in such case determining the cache size for a selected expiry time necessarily includes using only non-expired requests in the determining since the minimum non-expired time is non-expired by definition. For example, with reference to FIG. 1B a selected minimum non-expired time can correspond to a current time plus 5 seconds ($t_{MIN}=t_C+5$), then all hashed keys 115a through 115f of requests 110a through 110f, respectively, associated with counters at action 208 of FIG. 3 are counted and the determined cache size is:

Cache size =

$$(2 \times 2MB) + (0 \times 4MB) + (2 \times 6MB) + (1 \times 8MB) + (1 \times 14MB) = 38MB$$

In another example according to embodiments, if the selected expiry time is a mean (i.e., average) expiry time in the sorted list, which with reference to FIG. 1B corresponds to a mean TTL value of:

$$TTL_{mean} = \frac{1800 + 60 + 86700 + 180 + 2592000}{5} = 536148 \text{ seconds,}$$

the respective hashed keys of requests 110d (non-expiring) and 110f (TTL of 2592000) associated with counters at action 208 of FIG. 3 are counted and the determined cache size is:

Cache size =

$$(0 \times 2MB) + (0 \times 4MB) + (1 \times 6MB) + (0 \times 8MB) + (1 \times 14MB) = 20MB.$$

In the above example, the request 110d that does not have a TTL is omitted from determining the mean expiry time. In another example, such request may be included in the total number of requests (equal to six) used in determining the mean expiry time, resulting in the mean TTL value of:

$$TTL_{mean} = \frac{1800 + 60 + 86700 + 180 + 2592000}{6} = 446790 \text{ seconds}$$

At action 220 of the method 200, a cache having the determined cache size is allocated, for example by a caching server. Allocating the cache having the determined size includes reserving a portion of the memory (e.g. of a caching server) having the determined cache size for storing data.

FIG. 4

FIG. 4 shows an embodiment of a sorted list 130 in accordance with the present disclosure. The sorted list 130 includes entries request expiry times 133 $t_E=t_C+TTL_N$ determined by adding the TTL of the request N to the current time $t_C$ (e.g. time when the request is received). The sorted list 130 includes entries 133 based on requests 110a through 110f of the batch of requests of FIG. 1B. Request 110d having no TTL may be optionally added to the sorted list with, for example, an undefined or infinite respective expiry time 133d. In some cases, requests without TTL may be omitted from the sorted list.

In embodiments according to the present disclosure, each request in a batch of requests is or at least includes a request to store respective data (i.e., storing data in a cache) and having a respective size defined as a sum of at least the size of the key of the request and the size of the data of the request. Each request in a batch a key and the data to be stored, and may include other elements, for example, such as those described above with reference to FIG. 1A. In embodiments of the present disclosure, such requests are, for example, SET requests, SET access traces, cache write requests, cache PUT requests or other similar or related requests for storing data in a cache (or requesting a cache for storing data therein). Such requests, generally, are for adding content to a cache instance.

In embodiments, a batch or plurality of requests may be received from the same application, the same (e.g., predetermined, preauthorized, registered, etc.) set of application users or clients, or a combination thereof.

In embodiments, a batch or a plurality of requests can be defined as a preset or predetermined quantity of requests having unique hashed keys, for example.

In embodiments, a batch or a plurality of requests can be defined as requests received over a preset or predetermined period of time, for example.

In embodiments, a batch or a plurality of requests can be defined as a combination of a preset quantity of requests (e.g., having unique hashed keys) and as requests received over a preset period of time. For example, received requests may be continuously processed, as described elsewhere herein, by associating each hashed request key with a respective counter until either a preset or predetermined period of time has passed, or a preset or predetermined quantity of (e.g., unique) hashed keys of requests have been processed, whichever is reached first, or whenever both preset period of time and preset number of requests are reached.

In embodiments, a request has a key associated with its respective data. Such key is hashed before being associated with a respective counter. Such hashed key results from applying a hashing function to the key. The key allows subsequent retrieval of request data from cache or an update of the stored request data and/or a feature, such as a TTL thereof, in cache, for example. The request size used in the determining of the cache size to be allocated can be obtained (e.g., calculated, computed) using at least sizes of the request key and request data, as descried elsewhere herein. Therefore, according to embodiments, the request size is determined in order to determine a counter to which the request is to be associated to in accordance with a data block size associated to the counter.

Sorted List

In embodiments, respective expiry time based on the respective TTL indicator of each request, if applicable (e.g., if a request has a TTL, if the caching platform supports TTL feature), is stored in a sorted list. Expiry times may be stored in the sorted list until expiry, for example. Expired entries may remain in the sorted list until the cache size is determined and may be removed from the sorted list thereafter as a single step, instead of after individual expiry, for example.

In embodiments, after determining cache size to be allocated, expired entries may be removed (e.g., evicted, deleted) from the sorted list. Expired entries may not be used in determining the cache size and can therefore be removed to, at least in part, improve system efficiency and processing resource consumption, for example.

In some embodiments, the same sorted list is used when processing subsequent batches of requests, with expired entries being removed, for example after each determining of cache size to be allocated. In other embodiments, the system may be configured to (e.g., additionally) remove expired entries at other times, such as after allocating cache, before adding new entries to the sorted list, before processing another batch of requests, after a preset time period, etc. In some cases, such as when a request is received having a same key as a previous request but a different TTL, then the (new) different expiry time corresponding to such TTL is added to the sorted list as well.

Expiry Time

In embodiments, expiry time (e.g., eviction time) of a request is based on TLL of the request, if such request includes a TTL (or TLL indicator). The expiry time $t_E$ may be, for example, a sum of the current time $t_C$ (e.g., the time at which the request is associated with a counter, the time at which the request is received, the time at which the data of the request is stored in cache, for example) and TTL.

In some embodiments, a request that does not have a TTL or TTL indicator may be omitted from the sorted list. In other embodiments, if a request does not have a TTL or TTL indicator, then the request does not expire and its corresponding expiry time may be noted in the sorted listed as non-expiry or infinite, for example. Such request without expiry time (or having infinite expiry time) is always counted when determining cache size to be allocated unless, for example, a selected expiry time is set to be an upper expiry limit, resulting in counting of non-expired requests having expiry times less than such selected expiry time. Such upper limit may be based on and/or used in cases of, for example, an eviction policy; a memory use pressure; cache flushing during maintenance, updates, system security alerts, or system outages; a particular system configuration such as cache partitioning; etc.

In embodiments, a selected expiry time (or a corresponding selected TTL indicator) may be one of the following, based on entries in the sorted list: a largest or a maximum non-expired expiry time (or a corresponding largest or maximum TTL indicator), a smallest or a minimum (e.g., non-expired at the current time and closest in the future to the current time) non-expired expiry time (or a corresponding smallest or minimum TTL indicator), a median of expiry times (or a median of corresponding TTL indicators), a mean of the expiry times (or a mean of corresponding TTL indicators). Notably, if no selected expiry time is set or a largest expiry time (e.g., largest on the list or infinite) is selected, the resulting size of the allocated cache is the largest for a given batch of requests and current time as it is determined using all non-expired requests. Such determined size of cache is closest to the added total of all request sizes in a batch and therefore advantageously corresponds to a near-zero cache miss rate.

In some embodiments, only non-expired entries in the sorted list are used in determining a selected expiry time, if applicable, and to consequently determine the cache size to be allocated. Omitting the expired requests from determining the cache size, at least in part, advantageously minimizes cache over-allocation. In other embodiments, all entries in the sorted list may be used in determining a selected expiry time.

In some embodiments, in a caching system supporting TTL, if a batch of requests includes at least one request with a TTL, then a sliding HLL counter or a set (plurality) of sliding HLL counters may be used to support TTL feature in allocating cache. Alternatively, other counters with similar capabilities may be employed.

In some embodiments, in a caching system supporting TTL, if no request in a batch of requests has a TTL or TTL indicator, then a (non-sliding) HLL counter or a set of (non-sliding) HLL counters may be used. Alternatively, other counters with similar capabilities may be employed. Therefore, a particular type of counter (e.g., HLL, sliding HLL) or set of counters may be deployed, at least in part, in response to features (e.g., TTL) of received requests.

Hashing the Key

In embodiments, a method for allocating cache can include hashing, for each request, a respective key of the data requested for storing, into a binary sequence, and adding each resulting hashed key to a corresponding counter of the set or plurality of counters in accordance with embodiments described elsewhere herein.

In embodiments, each request (i.e., respective key thereof) associated with a counter is hashed, for example, before or as it is associated with a counter. In other examples, the request key may be hashed before it is received, as it is received, after it is received, or otherwise as a part of processing of the request by associating (respective key) thereof with a counter, or a combination thereof (e.g., requests in a batch may be hashed at different stages), and a data block size associated to the counter, as described elsewhere herein. Therefore, as readily understood by a person skilled in the art, the key may be hashed at different times as long as the (non-hashed) key and the size of data of the request is available for determining of the request size for the purpose of selecting a corresponding counter.

Cache

In embodiments, the allocated cache is one of an allocated serverless cache, an allocated write-behind cache, an allocated side cache, an allocated on-demand cache, or a combination thereof.

In embodiments, allocating a cache of a determined size includes configuring a cache to have a certain selected (determined) size, or a certain selected (determined) maximum size.

In embodiments, a step of associating the requests with respective one or more counters (e.g., action 208 of FIGS. 2-3) may include firstly associating (e.g., noting, entering) the hashed keys of requests with respective counters. In such embodiments, after all hashed keys of requests in the batch are associated with respective one or more counters, then secondly, respective estimated counts of unique (i.e., any hashed key repeated more than once is counted only once) hashed keys may be obtained at each of the one or more counters in a single (for each counter) step while taking into account any applicable counting parameters, such as a selected expiry time described elsewhere herein, for example. Advantageously, estimating cardinality (i.e. number of unique associated hashed keys) at each counter in a single step contributes to reducing (e.g., minimizing) a use of resources (e.g., time, computing resources, memory resources).

In an embodiment, a set of counters may include only one counter. A set or plurality of counters may include a single counter with an associated data block size. Such data block size is fixed and may be configurable (e.g., updated upon user request, fixed for a given user or application). In such example, each request (unique hash keys thereof) in a plurality or batch of requests, may be associated with the single counter if the fixed size of the cache data block that is at least as large as the size of an individual request. In such case, the cache size can be determined based on the hashed keys associated to the single counter and the fixed size of the associated data block by computing a product of estimated count of unique hashed keys associated to the counter with its (fixed) associated data block size.

In an embodiment, for a set of counters having a single counter with a fixed associated data block size, determining that a size of a request is larger than the fixed data block size may initiate an addition of a counter to the set with associated data block size at least as big as the data size of such request. In another embodiment, if the fixed data block size associated to the counter is also a preset cache size, such as a maximum cache size allowed to be allocated by a caching server or platform, then such request is not associated to the counter and is therefore omitted from determining the cache size.

In some embodiments, obtaining estimated counts of unique hashed keys for each counter and determining the cache size may be performed in a single step. The determining step would include obtaining estimated counts of unique hashed keys for each counter, while taking into account any counting parameters as noted elsewhere herein, and using such to compute the cache size to be allocated as described elsewhere herein.

In some embodiments, a new (e.g., default) set of counters (or slots) having no hashed keys associated thereto (i.e., empty) may be deployed for each new batch of requests. In some cases, a subsequent batch received, for example, from a same application or same set of users may use a same set of counters (i.e., non-expired hashed keys from all batches remain associated to respective counters until they are expired or otherwise cleared as described elsewhere herein). In some cases, a subsequent batch received from a different application or set of users may use a new (e.g., default) empty set of counters. As readily understood by a person skilled in the art, whether to use an already deployed set of counters or generate a new default set (i.e., having no hashed keys associated to any counter thereof) to be used for a particular batch may be configurable based, for example, on system settings, application, users, etc.

Counting Parameters

In embodiments, one or more counting parameters may be applicable when determining cache size. A counting parameter may be a selected expiry time, as described elsewhere herein. A counting parameter may be a condition to obtain estimated count of unique hashed keys of non-expired requests of a certain size, for example, by selecting to use such respective estimated counts at some counters while omitting such respective estimated counts of other counters based on associated data block sizes. A counting parameter may be a condition to obtain estimated count of unique hashed keys only once all requests in the batch have been processed by associating with respective one or more counters. A counting parameter may be a resource requirement, such as having a certain memory and/or computing resources available to implement the system and methods disclosed herein.

In embodiments, a set or plurality of counters is a set or plurality of HLL counters. Such embodiments support Variable Size Block (VSB) caching feature by having a different data block size associated with each counter in the set of counters.

In embodiments, a set or plurality of counters is a set or plurality of sliding HLL counters. Such embodiments support TTL caching feature by storing expiry times of requests in a sorted list and counting requests (i.e., obtaining estimated counts of unique hashed keys at each counter) based on a selected expiry time.

In embodiments, once a batch of requests is processed by associating each hashed request key with a corresponding (e.g., sliding HLL) counter, the associated requests are counted by obtaining estimated counts of unique hashed keys at each counter to determine cache size to be allocated. Therefore, the estimated count of associated unique (hashed keys of) requests at each counter can be obtained after all requests in the batch are processed.

HLL/Sliding HLL

In embodiments, using an HLL counter or a sliding HLL counter is a probabilistic method for determining the cardinality of a set of data, i.e., the number of unique elements in the set such as the number of unique requests in a batch or plurality of requests. It assumes that a hash function generates equally distributed hashed values. By using such hashed values (hash keys of request), the HLL or a sliding HLL method can approximate the number of unique elements in a data set (i.e., the number unique requests or hash keys thereof in a plurality of requests).

In embodiments, the set or plurality of counters can include a counter for each indicated data block size, and each counter can be an HLL counter.

In embodiments, each set or plurality of counters can include a counter for each indicated data block of the specified size, and each counter can be a sliding HLL counter.

By computing the estimated number of unique (i.e., repeat entries are counted only once) hashed keys, embodiments disclosed herein enable allocating a required cache size and may be used for an auto scaling feature of a caching service, for example.

FIG. 5

Figure 5:
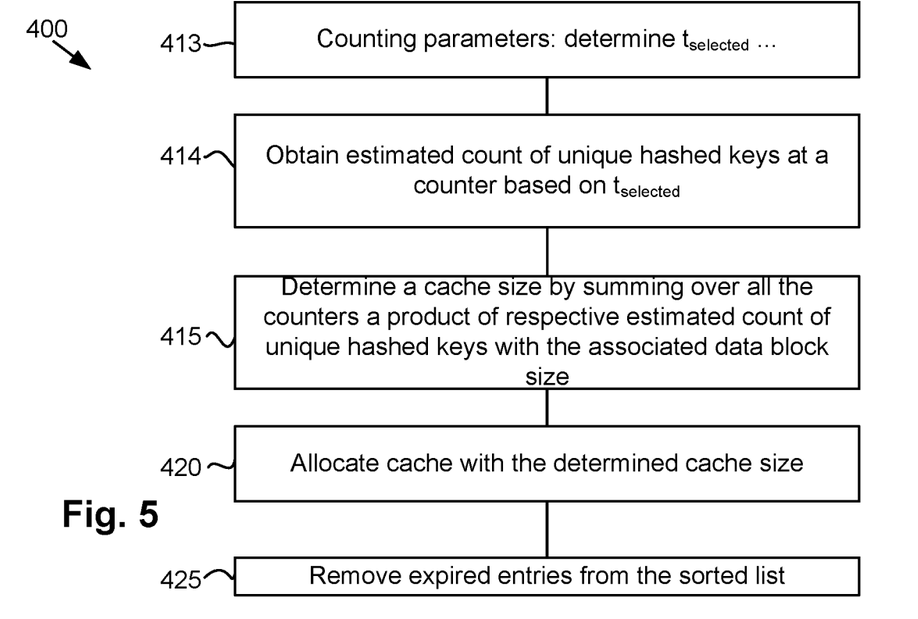
FIG. 5 shows a flowchart of a method for determining cache size, according to embodiments of the present disclosure.

FIG. 5 shows a flowchart of a method 400 for determining cache size for a batch of requests in which one or more requests have a respective TTL indicator in accordance with the present disclosure. The method 400 is applicable after all requests in a batch of requests have been processed by associating to a set of counters, as described elsewhere herein. This method 400 may represent steps 215 and 220 of FIG. 2 and steps 215 and 220 of FIG. 3, for example.

Method 400 includes a step 413 of determining applicable one or more counting parameters, such as a selected expiry time $t_{selected}$, described elsewhere herein. The selected expiry time is determined using entries in the sorted list. Method 400 further includes a step 414 of obtaining an estimated count of unique hashed keys, at each counter in a set of counters, for requests having non-expired expiry times based on respective TTLs and based on the selected expiry time at a current time (e.g., time at which the step 414 is performed). Obtaining the estimated count of unique hashed keys in step 414 is done for non-expired entries and is based on the selected expiry time determined in step 413 and therefore, takes such counting parameters into account.

As further illustrated in FIG. 5, the method 400 includes a step 415 of determining a cache size based on hashed keys associated to each counter and the respective data block size associated with each counter by summing over all the counters a product of each respective estimated count of unique hashed keys with the respective data block size. This step 415 may be substantially the same as step 215 of FIG. 2, for example. The method 400 further includes a step 420 of allocating, by a caching server, cache with the determined cache size. The method 400 further includes a step 425 of removing expired entries (i.e., expiry times) from the sorted list.

Figure 6:
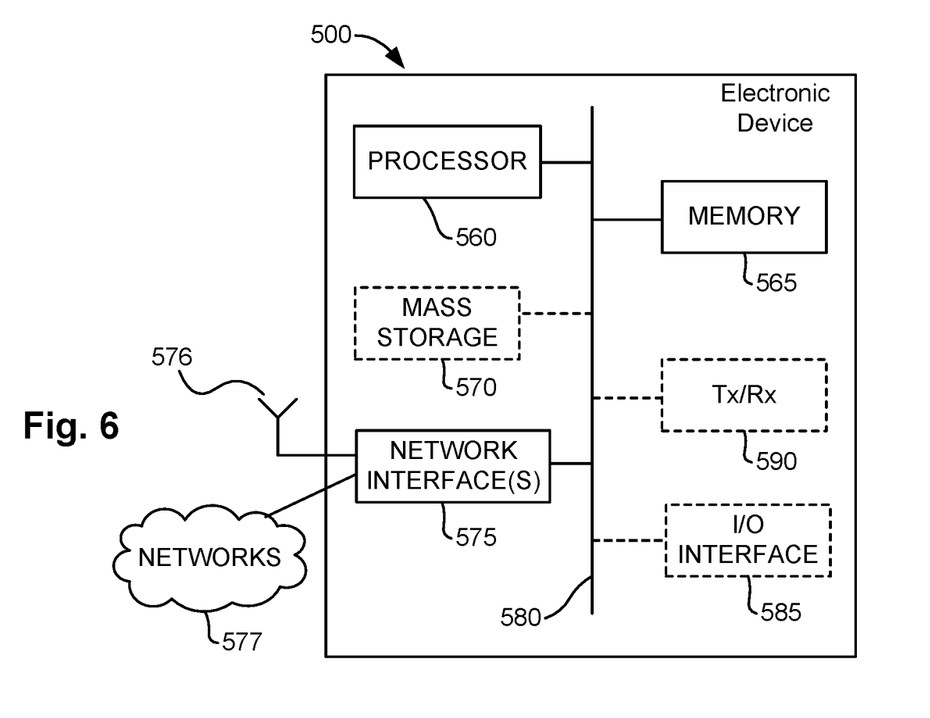
FIG. 6 shows a schematic illustration of an electronic device that may perform any or all of operations of the methods and features explicitly or implicitly described herein, according to embodiments of the present disclosure.

FIG. 6 shows a schematic diagram of an electronic device 500 that may perform any or all of the operations of the above methods and features explicitly or implicitly described herein, according to different embodiments of the present disclosure. For example, a computer equipped with network function may be configured as electronic device 500. The electronic device 500 may be used to implement the methods any one or more of FIGS. 2, 3, 5 and 6, for example.

As shown, the electronic device 500 may include at least one processor 560, such as a Central Processing Unit (CPU) or specialized processors such as a Graphics Processing Unit (GPU) or other such processor unit, memory 565, network interface 575, and a bi-directional bus 580 to communicatively couple the components of electronic device 500. The at least one processor 560 may be operatively coupled to a caching server. Electronic device 500 may also optionally include non-transitory mass storage 570, an I/O interface 585, and a transceiver 590. According to certain embodiments, any or all of the depicted elements may be utilized, or only a subset of the elements. Further, the electronic device 500 may contain multiple instances of certain elements, such as multiple processors, memories, or transceivers. Also, elements of the hardware device may be directly coupled to other elements without the bi-directional bus 580. Additionally or alternatively to a processor and memory, other electronics, such as integrated circuits, may be employed for performing the required logical operations.

The memory 565 may include any type of tangible, non-transitory memory such as static random access memory (SRAM), dynamic random access memory (DRAM), synchronous DRAM (SDRAM), read-only memory (ROM), any combination of such, or the like. The memory 565 in communication with the at least one processor 560 may have stored thereon a set of counters or slots for such set of counters or both. The mass storage element 830 may include any type of tangible, non-transitory storage device, such as a solid state drive, hard disk drive, a magnetic disk drive, an optical disk drive, USB drive, or any computer program product configured to store data and machine executable program code. According to certain embodiments, the memory 565 or mass storage 570 may have recorded thereon statements and instructions executable by the at least one processor 560 for performing any of the aforementioned method operations described above.

Network interface 575 may include at least one of a wired network interface and a wireless network interface. The network interface 575 may include a wired network interface to connect to a communication network 577 and may also include a radio access network interface 576 for connecting to the communication network or other network elements over a radio link. The network interface 575 enables the electronic device 500 to communicate with remote entities such as those connected to the communication network 577.

It will be appreciated that, although specific embodiments of the technology have been described herein for purposes of illustration, various modifications may be made without departing from the scope of the technology. The specification and drawings are, accordingly, to be regarded simply as an illustration of the disclosure as defined by the appended claims, and are contemplated to cover any and all modifications, variations, combinations or equivalents that fall within the scope of the present disclosure. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can be a compact disk read-only memory (CD-ROM), USB flash disk, or a removable hard disk. The software product may include a number of instructions that enable a computer device (personal computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, as used herein, the terms coupled, coupling, or connected can indicate that two elements or devices are directly connected to one another or connected to one another through one or more intermediate elements or devices via an electronic element depending on the particular context. The term "and/or" herein when used in association with a list of items means any one or more of the items comprising that list.

Although a combination of features is shown in the illustrated embodiments, not all of them need to be combined to realize the benefits of various embodiments of this disclosure. In other words, a system or method designed according to an embodiment of this disclosure will not necessarily include all features shown in any one of the Figures or all portions schematically shown in the Figures. Moreover, selected features of one example embodiment may be combined with selected features of other example embodiments.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method to allocate a cache in a memory, comprising:
   receiving a plurality of requests, each request of the plurality of requests including a request to store respective data to the cache, each request having a respective request size, each respective data being associated with a respective key;
   associating the plurality of requests to a set of counters, each counter of the set of counters being associated with a respective data block size that is different than the data block size associated with any other counter of the set of counters, the associating of the plurality of requests to the set of counters including:
   for each request:
      determining which counter of the set of counters has a smallest associated respective data block size that is at least as large as the respective request size of the request; and
      associating a hash of the key associated with the respective data of the request with the determined counter, the hash of the key being a hashed key;
   determining a cache size of the cache based on:
      a number of unique hashed keys associated with each respective counter of the set of counters; and
      the respective data block size of each counter of the set of counters;
   and
   allocating the cache by reserving, for caching, a portion of the memory, the portion of the memory having a size at least equal to the cache size.

2. The method of claim 1, wherein determining the cache size includes summing, over all the counters of the set of counters, a product of an estimated count of unique hashed keys associated with a respective counter by the data block size of the respective counter.

3. The method of claim 2, wherein the set of counters is a plurality of HyperLogLog (HLL) counters, the method further comprising utilizing the plurality of HLL counters to obtain the estimated count of unique hashed keys associated with the respective counter.

4. The method of claim 2, wherein:
   the set of counters comprises a single counter associated with a fixed data block size of a respective single data block,
   the associating of the plurality of requests to the set of counters comprising the single counter comprises:
   for each request of the plurality of requests:
      determining that the fixed data block size of the respective single data block is at least as large as the request size of the request;
   and
   determining the cache size comprises computing a product of the estimated count of unique hashed keys associated with the single counter with the fixed data block size of the respective single data block.

5. The method of claim 3, wherein:
   one or more request of the plurality of requests has a respective Time to Live (TTL) indicator,
   the plurality of HLL counters is a plurality of sliding HLL counters,
   the determining of the cache size comprises summing over all the sliding HLL counters of the plurality of sliding HLL counters, for a selected expiry time, a product of an estimated count of unique hashed keys of non-expired requests associated to a sliding HLL counter with the respective data block size.

6. The method of claim 5, further comprising, for each associated request, storing, in a sorted list, a respective expiry time based on the respective TTL indicator.

7. The method of claim 6, further comprising removing each expired respective expiry time from the sorted list.

8. The method of claim 6, wherein the selected expiry time is one of a median of respective expiry times in the sorted list, a mean of the respective expiry times in the sorted list, and a minimum of the non-expired respective expiry times in the sorted list.

9. The method of claim 1, wherein the allocated cache is one of an allocated serverless cache, an allocated write-behind cache, an allocated side cache, an allocated on-demand cache, or a combination thereof.

10. The method of claim 1, further comprising, when the request size of a request of the plurality of requests is larger than the data block size of any of the set of counters, and when the request size is equal to or less than a predetermined maximum size:
adding an additional counter to the set of counters, the additional counter having associated thereto an additional counter data block size that is at least as large as the request size of the request.

11. The method of claim 1, wherein the data block size is configurable.

12. The method of claim 1, wherein the cache of the determined size is allocated to satisfy a predefined performance requirement.

13. A system for allocating a cache, comprising:
at least one processor; and
machine readable memory storing machine readable instructions, which when executed by the at least one processor, configures the system to:
receive a plurality of requests, each request of the plurality of requests including a request for storing respective data to a caching memory, each request having a respective request size, each respective data being associated with a respective key;
associate the plurality of requests to a set of counters, each counter of the set of counters being associated with a respective data block size that is different than the data block size associated with any other counter of the set of counters, by, for each request of the plurality of requests:
determining which counter of the set of counters has a smallest associated respective data block size that is at least as large as the request size of the request; and
associating a hash of the key associated with the respective data of the request with the determined counter, the hash of the key being a hashed key;
determine a cache size based on:
a number of unique hashed keys associated with each respective counter of the set of counters; and
the respective data block size of each counter of the set of counters;
and
allocate the cache by reserving, for caching, a portion of the caching memory, the portion of the caching memory having a size at least equal to the cache size.

14. The system of claim 13, wherein the machine readable memory storing machine readable instructions which when executed by the at least one processor, configures the at least one processor to determine the cache size by summing, over all the counters of the set of counters, a product of an estimated count of unique hashed keys associated with a respective counter by the data block size of the respective counter.

15. A method to allocate a cache in a memory, comprising:
receiving a plurality of requests, each request of the plurality of requests including a request for storing respective data to the cache, each request having a respective request size, each respective data being associated with a respective key, at least one request of the plurality of requests having a respective Time to Live (TTL) indicator;
associating the plurality of requests to a set of sliding HyperLogLog (HLL) counters, each sliding HLL counter of the set of HLL counters being associated with a respective data block size, the associating of the plurality of requests to the set of sliding HLL counters including:
for each request:
determining which sliding HLL counter of the set of sliding HLL counters has a smallest associated respective data block size that is at least as large as the respective request size of the request; and
associating a hash of the key associated with the respective data of the request with the determined counter, the hash of the key being a respective hashed key;
determining a cache size of the cache, for a selected expiry time, based on:
a number of unique hashed keys associated with each respective sliding HLL counter of the set of sliding HLL counters; and
the respective data block size of each sliding HLL counter of the set of sliding HLL counters;
and
allocating the cache by reserving, for caching, a portion of the memory, the portion of the memory having a size at least equal to the cache size.

16. The method of claim 15, wherein determining the cache size of the cache, for the selected expiry time, includes summing, over all the sliding HLL counters of the set of sliding HLL counters, a product of an estimated count of unique hashed keys associated with a respective sliding HLL counter by the data block size of the respective sliding HLL counter.

* * * * *